United States Patent [19]
Niemeyer

[11] Patent Number: 5,568,934
[45] Date of Patent: Oct. 29, 1996

[54] ADJUSTABLE TRICYCLE

[75] Inventor: Duane J. Niemeyer, Olney, Ill.

[73] Assignee: Roadmaster Corp., Olney, Ill.

[21] Appl. No.: 478,719

[22] Filed: Jun. 7, 1995

[51] Int. Cl.$^6$ ................................ B62K 5/06; B62K 9/02
[52] U.S. Cl. ...................... 280/282; 280/1.188; 280/7.15; 280/62
[58] Field of Search ..................... 280/282, 288, 280/274, 281.1, 1.188, 7.15, 7.1, 30, 62

[56] References Cited

U.S. PATENT DOCUMENTS

| D. 232,307 | 8/1974 | Manofsky | 280/282 X |
|---|---|---|---|
| 1,358,746 | 11/1920 | Jones | 280/7.1 |
| 1,443,130 | 1/1923 | Hilpert | 280/7.1 |
| 2,068,125 | 1/1937 | Kraeft | 280/282 X |
| 2,400,265 | 5/1946 | Sieger | 280/1.188 |
| 3,352,570 | 11/1967 | Cordrey | 280/282 |
| 4,079,957 | 3/1978 | Blease | 280/278 |
| 4,546,991 | 10/1985 | Allen et al. | 280/282 |
| 4,657,270 | 4/1987 | Allen et al. | 280/282 X |
| 4,958,842 | 9/1990 | Chang | 280/282 X |

FOREIGN PATENT DOCUMENTS

| 1428565 | 1/1965 | France | 280/282 |
|---|---|---|---|
| 2008506 | 6/1979 | United Kingdom | 280/282 |
| 1571887 | 7/1980 | United Kingdom | 280/7.15 |

Primary Examiner—Anne Marie Boehler
Assistant Examiner—F. Zeender
Attorney, Agent, or Firm—Brinks Hofer Gilson & Lione

[57] ABSTRACT

The adjustable tricycle of the present invention encompasses a body having a front and a rear, a front wheel rotatably attached to the front of the body, a handle bar member pivotally connected to the front of the body for steering the front wheel, a pivotable link mounted on the body; a pair of rear wheels rotatably mounted on the pivotable link, and a positioning device pivotally connected to the pivotable link for controlling the position of the body with respect to the rear wheels. The pivotable link and pivoting positioning device form an angular positioning device which controls the position of the body with respect to the rear wheels. In the preferred embodiment, the positioning device is a support bar capable of interlocking the rear end of the body in at least two locations.

23 Claims, 4 Drawing Sheets

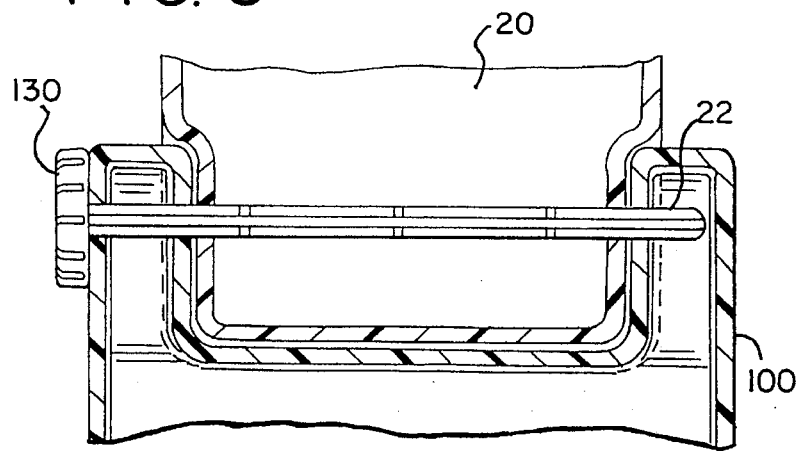
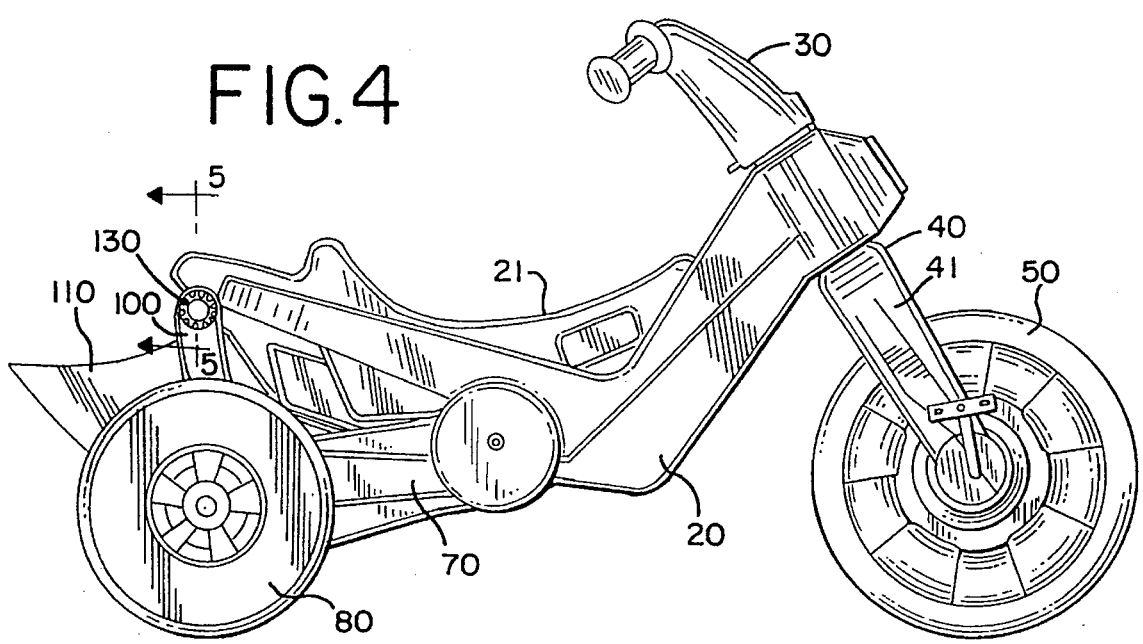
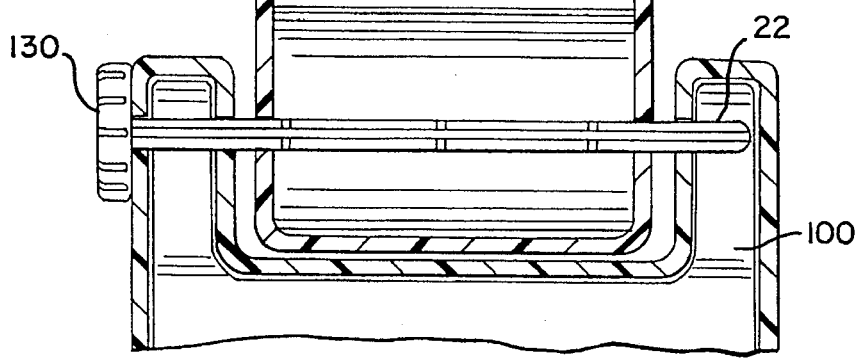

FIG. 6
FIG. 7
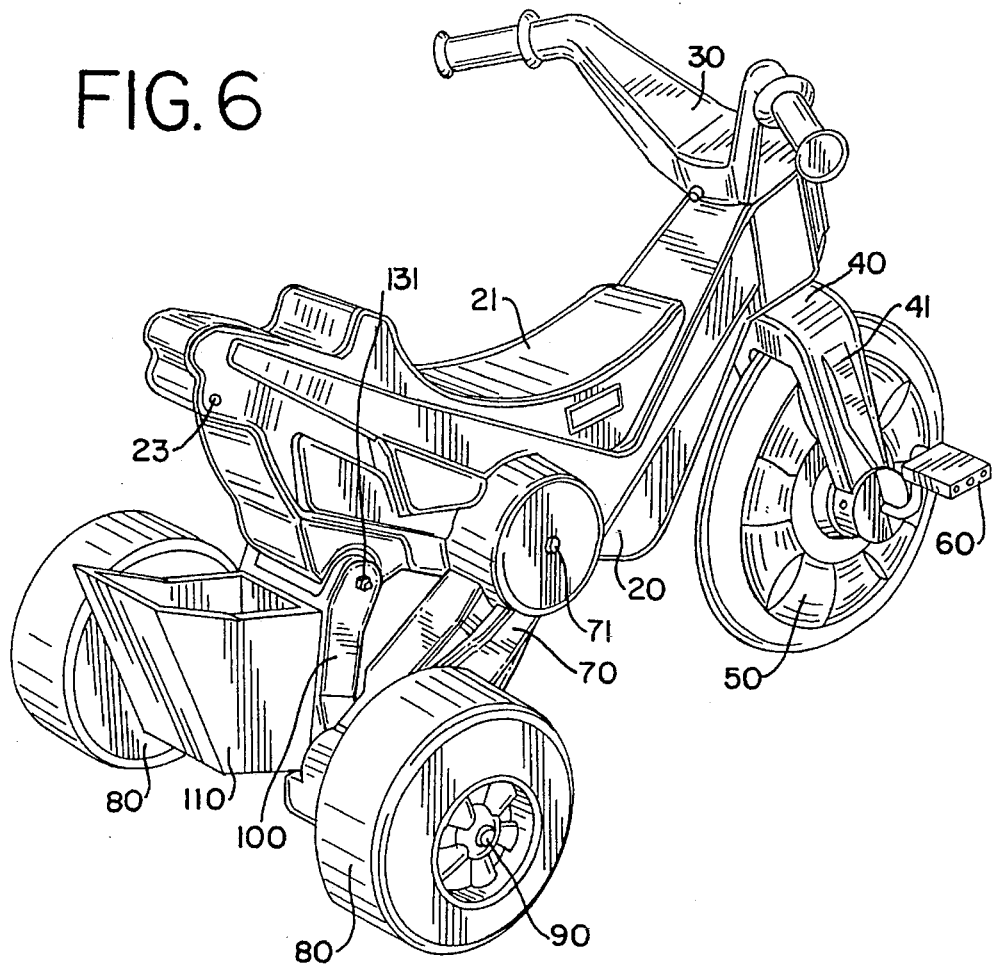
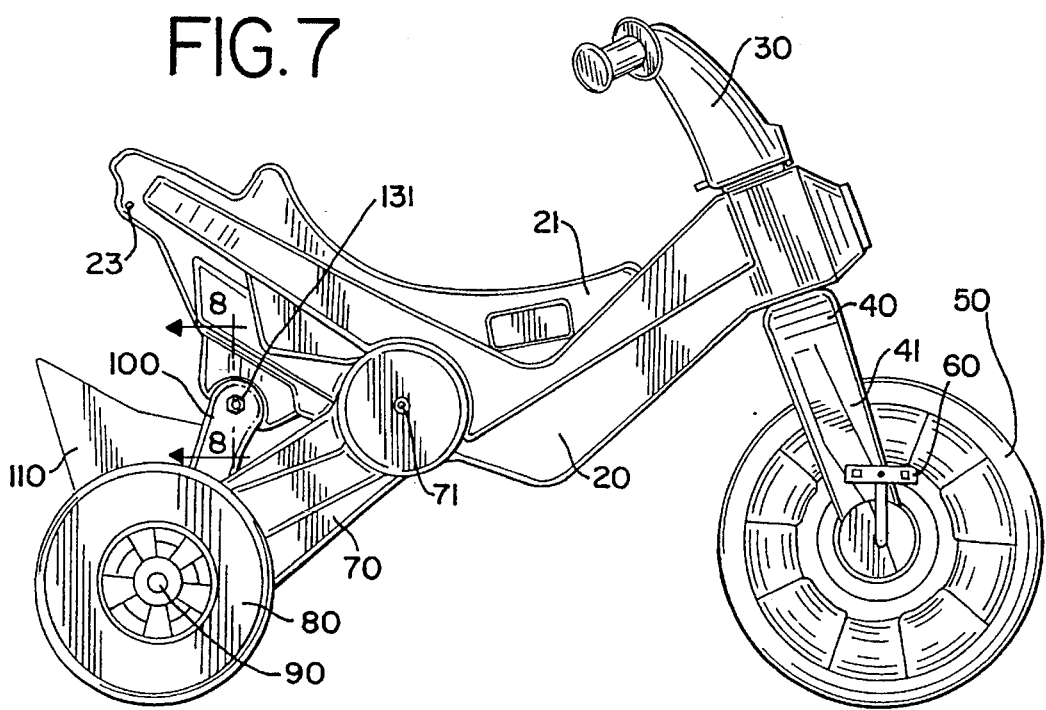

5,568,934

ADJUSTABLE TRICYCLE

BACKGROUND OF THE INVENTION

The present invention relates to a tricycle, and more specifically to a tricycle with a positioning device for controlling the position of the body with respect to the rear wheels.

The prior art is replete with various types of tricycles. The traditional tricycle includes a body having a relatively high seat, a front wheel, handlebars and a pair of rear wheels. Typically, the seat of the traditional tricycle is capable of being adjusted only upwardly or downwardly. There usually is no structure to allow forward and rearward adjustment of the seat relative to the body to position the seat a distance from the pedals which is comfortable for a rider.

Another type of tricycle common in the art encompasses a body which is low slung in comparison to the traditional tricycle. The seat of the low slung tricycle typically is adjustable only forwardly and rearwardly. There is no element for elevating the seat relative to the frame to bring the rider closer to the handlebars.

One disadvantage common among both types of prior art tricycles is that they cannot be easily converted from one style to the other. Furthermore, although convertible tricycles have been introduced in the past, conversion is not easily accomplished. Altering the seat position of a convertible tricycle usually involves disengaging the entire frame from the other parts of the tricycle. This is often difficult for the rider; typically a young child.

There is a need for a tricycle in which the body can be easily and readily adjusted from one position to another without disengaging all of the parts of the tricycle. The ease of adjustability would provide increased enjoyment to the rider. Such a tricycle would also appeal to consumers because it is capable of accommodating a growing child.

SUMMARY OF THE INVENTION

The present invention encompasses an adjustable tricycle. In the first aspect, the invention includes a body having a front and a rear, a front wheel rotatably attached to the front of the body, a handle bar member pivotally connected to the front of the body for steering the front wheel, a pivotable link mounted on the body, a pair of rear wheels rotatably mounted on the pivotable link and a positioning device pivotally connected to the pivotable link for controlling the position of the body with respect to the rear wheels. In the preferred embodiment, the positioning device is a support bar capable of interlocking the rear end of the body in at least two locations.

In the second aspect, the invention includes a body having a front and a rear, a front wheel rotatably attached to the front of the body, a handle bar member pivotally connected to the front of the body for steering the front wheel, a pair of rear wheels rotatably mounted on a rear axle, and an angular positioning device pivotally connected to the rear axle for controlling the position of the body with respect to the rear wheels.

One of the advantages of the invention is that conversion from one position to another may be easily accomplished without disengaging all of the components of the tricycle. Another advantage lies in the tricycle's capacity to accommodate riders of various sizes.

BRIEF DESCRIPTION OF THE DRAWINGS

FIG. 3 is a cross-sectional view of the tricycle of FIG. 2 taken along the line 3—3.

FIG. 4 is a side view of the tricycle of FIG. 1 in a second position.

FIG. 5 is a cross-sectional view of the tricycle of FIG. 4 taken along line 5—5.

FIG. 6 is a perspective view of a second preferred embodiment of the tricycle of the present invention in a first position.

FIG. 7 is a side elevational view of the tricycle of FIG. 6.

DETAILED DESCRIPTION OF THE DRAWINGS AND PREFERRED EMBODIMENTS OF THE INVENTION

Figure 1:
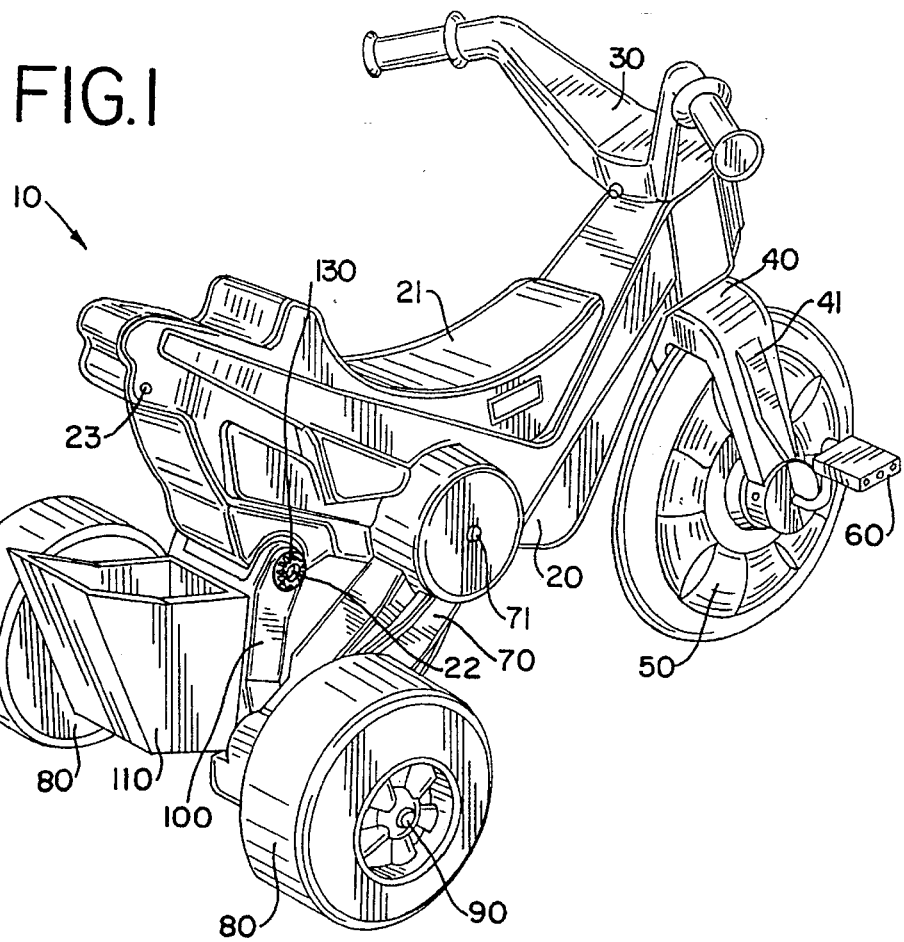
FIG. 1 is a perspective view of a preferred embodiment of the tricycle of the present invention in a first position.

Referring initially to FIG. 1, a preferred embodiment of the tricycle of the present invention is disclosed. As illustrated, the tricycle 10 includes a body 20 having a front and a rear. In the preferred embodiment, the body is shaped so as to include seat 21.

A pair of handlebars 30 are pivotally connected to the front of the body 20 for steering. Handlebars 30 pass through a corresponding aperture in the body 20 and are mounted on fork member 40. Fork member 40 is rotatably mounted on the front end of the body 20 in association with handlebars 30. Fork member 40 comprises two prongs 41. The front wheel 50 is rotatably attached to the fork member 40 by means of a front axle. The front wheel 50 is driven by pedals 60 which are also attached to the front axle and hence to the front wheel 50.

The tricycle 10 also includes a pivotable link 70 mounted on the body 20. In the preferred embodiment, the pivotable link 70 is pivotally connected to the body 20 by means of a rod 71 which is inserted through corresponding apertures in the pivotal link 70 and body 20 and thus held securely in place. The rear wheels 80 are rotatably mounted on the pivotable link 70. Preferably, the rear wheels 80 and pivotable link 70 are mounted on a rear axle 90. Alternately, each rear wheel 80 may be mounted on a separate rear axle. The position of the body 20 with respect to the rear wheels 80 is controlled by a positioning device which is pivotally connected to the pivotable link 70.

Figure 2:
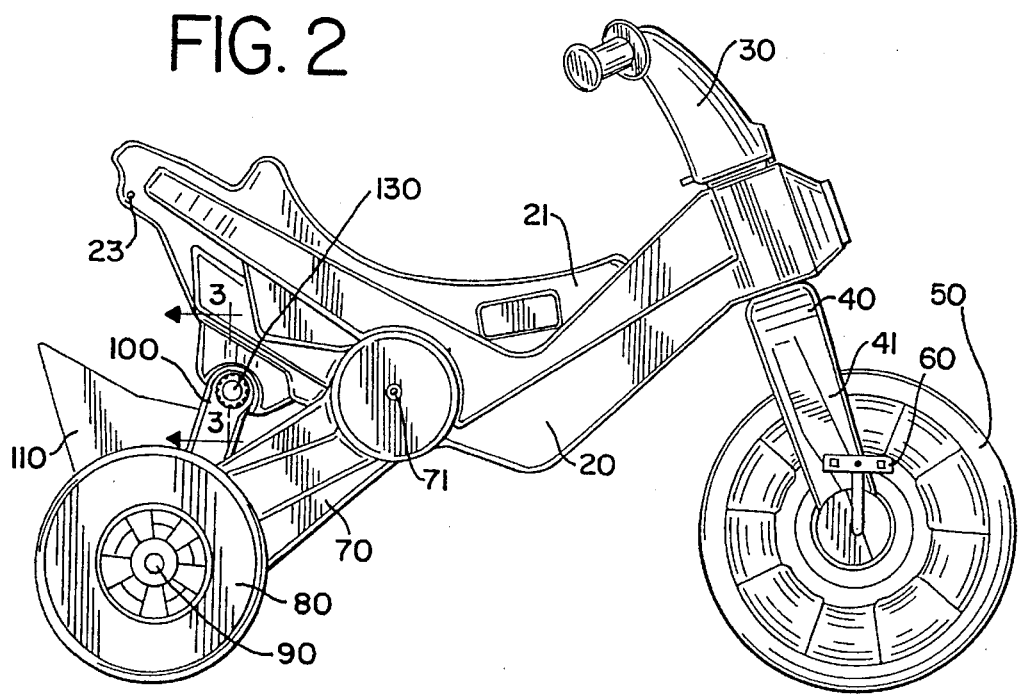
FIG. 2 is a side elevational view of the tricycle of FIG. 1.
Figure 8:
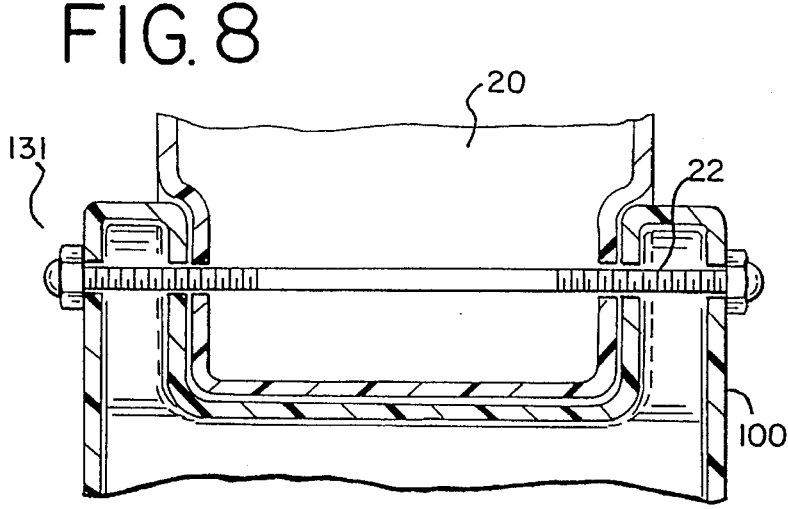
FIG. 8 is a cross-sectional view of the tricycle of FIG. 7 taken along the line 7—7.
Figure 9:
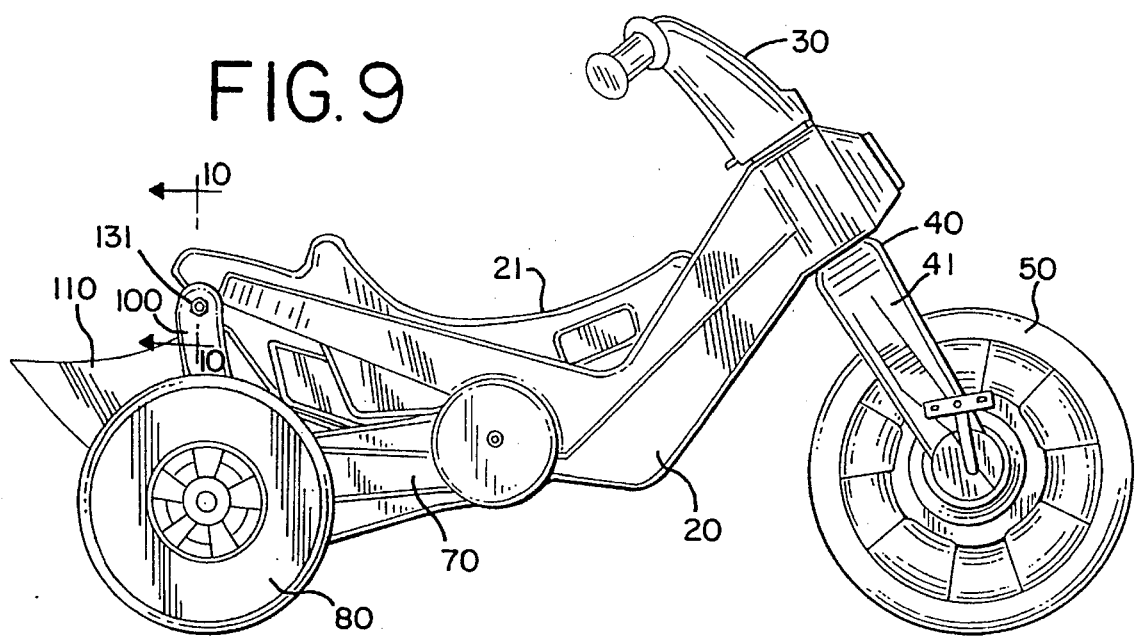
FIG. 9 is a side view of the tricycle of FIG. 6 in a second position.
Figure 10:
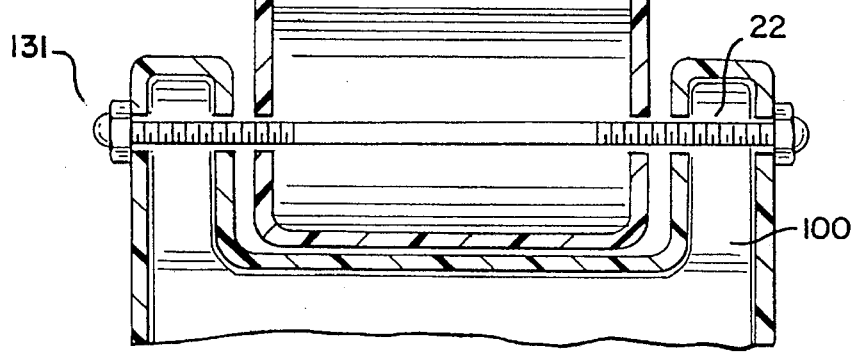
FIG. 10 is a cross-sectional view of the tricycle of FIG. 4 taken along line 10—10.

In the preferred embodiment, the positioning device comprises a support bar 100. The support bar 100 is capable of interlocking the rear of the body 20 in at least two locations. FIGS. 1 and 2 illustrate the tricycle 10 with the support bar 100 engaged in a first position through body aperture 22. FIG. 4 illustrates the tricycle with the support bar engaged in a second position through body aperture 23. Also in one preferred embodiment, the tricycle 10 includes a basket 110 mounted on the rear axle 90 for carrying objects. Of course, the basket 110 may be of a different shape, or not included on other embodiments.

Turning to FIG. 3, the tricycle 10 may be adjusted from the first position to the second position by removing pin 130 from the support bar 100 and body 20. The body 20 is then lowered so that body aperture 23 is aligned with the aperture in the support bar 100. The pin 130 is then reinserted in through the body 20 and support bar 100.

In the preferred embodiment, the pivotable link 70 and support bar 100 are both pivotally connected to the rear axle 90 between rear wheels 80. Thus, the pivotable link 70 and support bar 100 form an angular positioning device which controls the position on the body with respect to the rear wheels. When the position of the body 20 is adjusted, the angle between the pivotable link 70 and the support bar 100 also changes.

One variation of the present invention involves forming the body 20 to include recesses where body apertures 22 and 23 are presently located. In this embodiment, the recesses would interlock with support bar 100 in a snap fit manner, thus alleviating the need for the apertures 22, 23 and a pin 130.

A second variation, illustrated in FIGS. 6–10, replaces the pin 130 with a removable bar 131.

Another variation of the present invention involves the use of a fork that enables the height of the front wheel to be adjusted. The details of such a fork are disclosed in copending utility patent application Ser. No. 08/430,726 filed on Apr. 28, 1995 and hereby incorporated by reference.

The tricycle 10 is preferably made of plastic. In the preferred embodiment, the body of the tricycle is blow molded plastic.

One advantage of the tricycle 10 described herein is that the position of the body 20, and ultimately the seat 21, can be adjusted without disengaging all of the components of the tricycle 10.

A second advantage lies in the capacity of the tricycle to accommodate riders of various sizes.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

I claim:

1. A tricycle comprising:
   a) a body having a front and rear;
   b) a front wheel rotatably attached to the front of said body;
   c) a handlebar member pivotally connected to the front end of said body for steering said front wheel;
   d) a pivotable link mounted on said body;
   e) a pair of rear wheels rotatably mounted on said pivotable link; and
   f) a positioning device pivotally connected to said pivotable link and moveable between at least a first and a second position with respect to the body wherein the position of said body with respect to said rear wheels is changed by moving said positioning device between said first and second positions.

2. The tricycle recited in claim 1 wherein said body comprises a seat for a rider.

3. The tricycle recited in claim 1 comprising a fork member pivotally mounted on the front of said body, said fork member having two prongs to which said front wheel is rotatably attached.

4. The tricycle recited in claim 3 wherein said handlebar is mounted on said fork member.

5. The tricycle recited in claim 1 wherein said front wheel has two pedals attached thereto.

6. The tricycle recited in claim 1 wherein said rear wheels are mounted on said pivotal link by a rear axle.

7. The tricycle recited in claim 1 further comprising a basket mounted on said rear axle for carrying objects.

8. The tricycle recited in claim 1 wherein said positioning device is connected to said pivotable link by a rear axle.

9. The tricycle recited in claim 8 wherein said positioning device is connected to said rear axle between said rear wheels.

10. The tricycle recited in claim 1 wherein said positioning device comprises a support bar capable of interlocking the rear end of said body in at least two locations.

11. The tricycle recited in claim 1 made out of plastic.

12. A tricycle comprising:
   a) a body having a front and rear;
   b) a front wheel rotatably attached to the front of said body;
   c) a handlebar member pivotally connected to the front of said body for steering said front wheel;
   d) a pair of rear wheels rotatably mounted on a rear axle; and
   e) an angular positioning device having two members pivotally connected to each other at an apex, the device connected to the body and at its apex to said rear axle, whereby the position of said body with respect to said rear wheels is changed by changing the angle between the two members.

13. The tricycle recited in claim 12 wherein said angular positioning device comprises a pivotable link and a support bar, said pivotable link pivotally connected to said body, said support bar capable of interlocking the rear end of said body in at least two locations, said pivotable link and said support bar connected to each other through said rear axle such that the angle between said pivotable link and said support bar varies when said body is moved from a first to a second position.

14. The tricycle recited in claim 13 wherein said support bar is locked into said body by a removable pin.

15. The tricycle recited in claim 13 wherein said support bar is locked into said body by a removable bar.

16. The tricycle recited in claim 13 wherein the support bar snap fits into corresponding recesses in the body of the tricycle.

17. The tricycle recited in claim 12 made out of plastic.

18. A tricycle comprising:
   a) a body having a front an rear;
   b) a front wheel rotatably attached to the front of said body;
   c) a handlebar member pivotally connected to the front end of said body for steering said front wheel;
   d) a pivotable link mounted on said body;
   e) a pair of rear wheels rotatably mounted on said pivotable link; and
   f) a positioning device pivotally connected to said pivotable link by a rear axle for controlling the position of said body with respect to said rear wheels.

19. The tricycle recited in claim 18 wherein said positioning device is connected to said rear axle between said rear wheels.

20. A tricycle comprising:
a) a body having a front and a rear;
b) a front wheel rotatably attached to the front of said body;
c) a handlebar member pivotally connected to the front of said body for steering said front wheel;
d) a pair of rear wheels rotatably mounted on a rear axle; and
e) an angular positioning device pivotally connected to said rear axle for controlling the position of said body with respect to said rear wheels, wherein said angular positioning device comprises a pivotable link and a support bar, said pivotable link pivotally connected to said body, said support bar capable of interlocking the rear end of said body in at least two locations, said pivotable link and said support bar connected to each other through said rear axle such that the angle between said pivotable link and said support bar varies when said body is moved from a first to a second positions.

21. The tricycle recited in claim 20 wherein said support bar is locked into said body by a removable pin.

22. The tricycle recited in claim 20 wherein said support bar is locked into said body by a removable bar.

23. The tricycle recited in claim 20 wherein the support bar snap fits into corresponding recesses in the body of the tricycle.

* * * * *

UNITED STATES PATENT AND TRADEMARK OFFICE
CERTIFICATE OF CORRECTION

PATENT NO. : 5,568,934
DATED : October 29, 1996
INVENTOR(S) : Duane J. Niemeyer

It is certified that error appears in the above-identified patent and that said Letters Patent is hereby corrected as shown below:

In the Claims

In claim 18, line 2, please change "front an rear" to --front and rear--.

In claim 20, line 19, please change "positions" to --position--.

Signed and Sealed this

Thirtieth Day of January, 2001

Attest:

Q. TODD DICKINSON

Attesting Officer

Director of Patents and Trademarks